Dec. 4, 1962  H. KASPEROWICZ ET AL  3,067,349
METHOD FOR PRODUCING REGISTERED COLOR
SCREEN CATHODE-RAY TUBES
Filed Aug. 6, 1959                                       8 Sheets-Sheet 1

INVENTORS
KENNETH SUEHNHOLZ
HENRY KASPEROWICZ
BY
ATTORNEY

Dec. 4, 1962  H. KASPEROWICZ ET AL  3,067,349
METHOD FOR PRODUCING REGISTERED COLOR
SCREEN CATHODE-RAY TUBES
Filed Aug. 6, 1959  8 Sheets-Sheet 3

INVENTORS
KENNETH SUEHNHOLZ
HENRY KASPEROWICZ

BY *William V. Pearce*

ATTORNEY

INVENTORS
KENNETH SUEHNHOLZ
HENRY KASPEROWICZ
BY
ATTORNEY

ULTRA VIOLET LIGHT

INVENTORS
KENNETH SUEHNHOLZ
HENRY KASPEROWICZ

BY *William V. Pence*

ATTORNEY

Dec. 4, 1962  H. KASPEROWICZ ET AL  3,067,349
METHOD FOR PRODUCING REGISTERED COLOR
SCREEN CATHODE-RAY TUBES
Filed Aug. 6, 1959  8 Sheets-Sheet 6

INVENTORS
KENNETH SUEHNHOLZ
HENRY KASPEROWICZ
BY
ATTORNEY

Dec. 4, 1962

H. KASPEROWICZ ET AL 3,067,349

METHOD FOR PRODUCING REGISTERED COLOR SCREEN CATHODE-RAY TUBES

Filed Aug. 6, 1959

INVENTORS
KENNETH SUEHNHOLZ
HENRY KASPEROWICZ

BY

ATTORNEY

Dec. 4, 1962  H. KASPEROWICZ ET AL  3,067,349
METHOD FOR PRODUCING REGISTERED COLOR
SCREEN CATHODE-RAY TUBES
Filed Aug. 6, 1959  8 Sheets-Sheet 8

INVENTORS
KENNETH SUEHNHOLZ
HENRY KASPEROWICZ
BY
ATTORNEY

United States Patent Office 3,067,349
Patented Dec. 4, 1962

3,067,349
METHOD FOR PRODUCING REGISTERED COLOR SCREEN CATHODE-RAY TUBES
Henry Kasperowicz, Clifton, and Kenneth Suehnholz, Paramus, N.J., assignors to Paramount Pictures Corporation, New York, N.Y., a corporation of New York
Filed Aug. 6, 1959, Ser. No. 831,980
20 Claims. (Cl. 313—92)

This invention relates to methods, using controlled electron scanning techniques, for producing registered color screens for direct view cathode-ray tubes for the reconstitution of color images as received from color television broadcasts and the like, and is particularly directed but not necessarily limited to methods for producing striated screen surfaces by the use of said electron scanning means using different electron exposures for each controlled scan.

Cathode-ray tubes designed for the reconstitution of polychrome images have disposed generally on their viewing surfaces a geometric pattern of phosphor elements which upon electron bombardment fluoresce in different colors, and in accordance with predetermined signals indicative of information transmitted produce different color images. The phosphor elements disposed upon the tube viewing surfaces must be correctly and precisely aligned thereon so that no distortion or color contamination will be produced as a result of the electron bombardment of the phosphor elements. To avoid this defect the phosphor elements must be in perfect registry with the electron color selecting electrode which controls the electron beam and determines the location where the electrons are to impinge.

Up to the present time, all phosphor coating methods utilized in the production of cathode-ray tubes for the reconstitution of polychrome images have depended upon variations of well-known photographic processes to achieve, for example, a tri-color face plate panel. Due to inherent characteristics of such methods, final registry between the geometrically displayed phosphors and their shadow masks and/or grid frames, whatever the case may be, has been a rather formidable obstacle in the production runs of such type tubes. These obstacles were overcome in the invention entitled "An Electronic Process for Forming Color Television Screens" invented by Henry Kasperowicz et al. and described in a copending application filed August 4, 1959, Serial No. 831,565, now abandoned and also in the invention by Paul Raibourn entitled "Method of Making Color Cathode Ray Tubes" filed October 29, 1958, Serial No. 770,153, now abandoned. In the said Henry Kasperowicz et al. application, a method was described for forming color screens upon the tube face plate panel which uses controlled electron scan techniques. Essentially a first positive image is formed by a first controlled electronic scan so that a first phosphor color stripe pattern is deposited upon the tube face plate panel. The process is then repeated for a second electron scan, the electron beam being oriented in a different position than the first. The final or third phosphor stripe is then merely deposited between the first two phosphor stripes since there is no further need for an additional or third electron scan because the first two stripes act as a guide for the third stripe. Each controlled scan requires the assembly of the panel to be coated in a demountable cathode-ray tube and subsequent disassembling of the panel after the said panel has been exposed to the controlled electron beam. This assembling must take place two times to accomplish the dual exposure of the screen for two separate positions of the beam. Although this process is an improvement over the prior art it still requires two separately controlled electron scans, thus necessitating assembling and disassembling the demountable cathode-ray tube with parameters for the additional scan being adjusted again to give the same scanning results. This means additional time and accuracy is required in generating the second scan and pumping down the tube to develop the necessary vacuum. Further, there is no guaranty that the color selecting electrode will be placed in registry with the phosphor strips.

To overcome the limitations inherent in the two electron scan method, it is proposed to use in this invention a single electron scan and achieve the same purpose or end result intended by the dual scan method without assembling and disassembling the demountable cathode-ray tube more than once. This is done by first applying, as in the dual scan method, a thin coating or film of electron-sensitive resin with a conductive embodied therein over the face plate panel of the cathode-ray tube in the usual manner. The panel is then placed in a demountable tube as described in the previously mentioned application with all the electron control electrodes properly adjusted for developing and controlling the electron beam in a predetermined manner. The product of the electron beam density and time of scan, designated for convenience as the scan factor, determines the degree of exposure and therefore is a direct function of the time necessary for developing the electron image. Therefore, a first scan factor is used for a first color field and a second scan factor is next subsequently used for a second color field during two separate electron scans without dismounting the tube assembly, thus producing two different exposure and forming latent images of two representative color fields. After the dual exposures have been made the panel is disassembled from the tube assembly and the latent images developed. The development time for the greater scan factor or exposure will be less than for the smaller scan factor or exposure, if the developer concentration remains constant. After one latent image is developed, the first color phosphor is deposited and fixed, subsequently the second latent image is developed and the second color phosphor deposited and fixed. The third color phosphor is then merely deposited between the other two, and fixed, so that a tri-color screen in registry with its controlling electrode is produced.

It is, therefore, one of the main objects of the invention to provide a method for making improved cathode-ray tubes for the reconstitution of polychrome images.

Another object of the invention is to provide a method for making color screens by cathode-ray controlled electron scanning techniques in a demountable tube assembly and wherein the assembling and disassembling of the tube is reduced to minimum for any predetermined number of electron beam exposures of the said screen.

Another object of the invention is to provide a method for making color screens by cathode-ray controlled electron scanning techniques in a demountable tube assembly and wherein the assembling, pumping down to develop a vacuum and disassembling of the tube takes place only once for any predetermined number of electron beam exposures of the screen.

A still further object of the invention is to provide a method for making color screens in cathode-ray tubes which uses variations in the product of beam current and scanning time for different color switching positions to create a plurality of latent image color positions for each control electrode switching position, each latent image being disposed to appear in accordance with the development time necessary to fix the images.

And a still further object of the invention is to provide a method for forming color target structures in cathode-ray tubes and the like which is simple, accurate, economical, requires less fabrication time and enhances the registry between the color screen phosphor elements and their corresponding parts forming the color control electrode structure.

Other objects and advantages will become readily apparent from a reading of the specifications when taken in conjunction with the accompanying drawings wherein.

Figure 1:
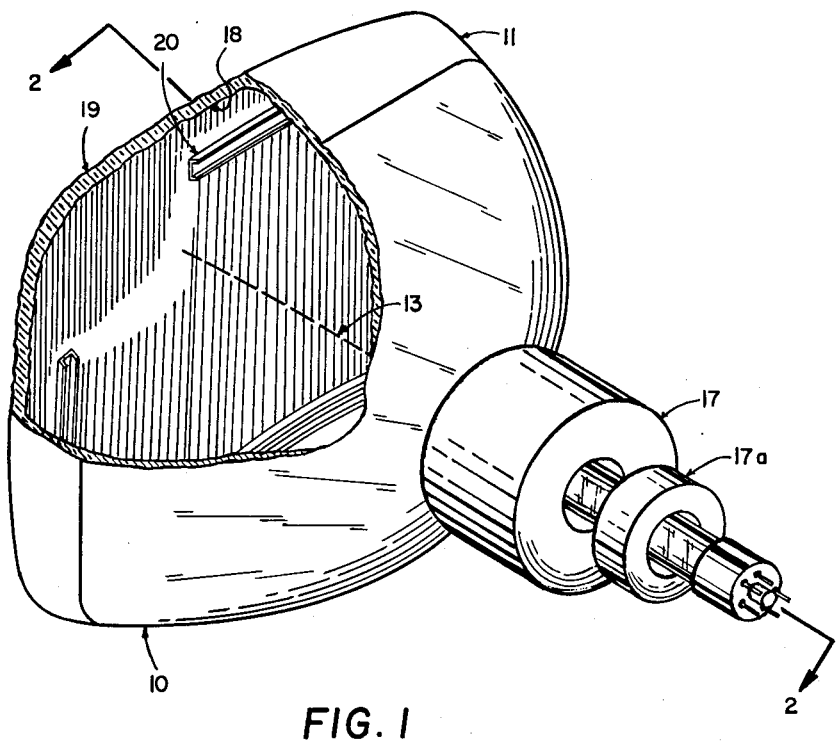
FIG. 1 shows in perspective and partially sectioned a color cathode-ray tube disposed to use the invention as disclosed herein.
Figure 2:
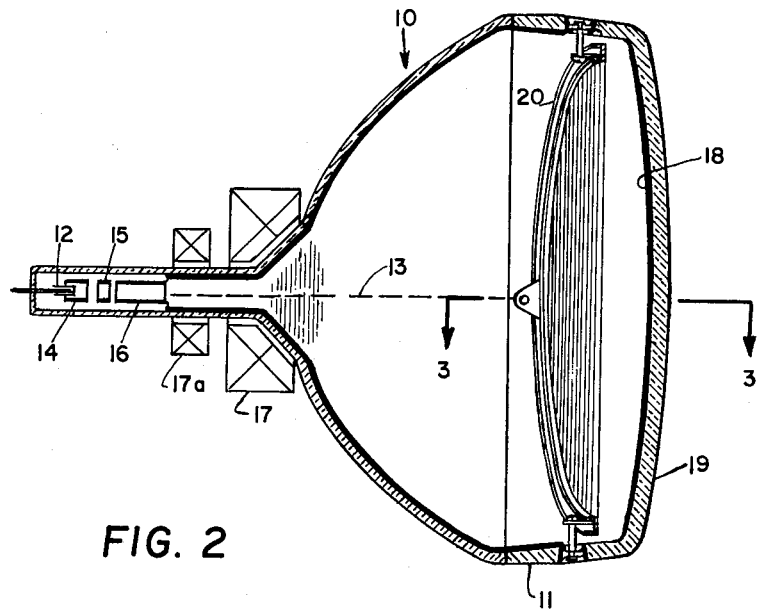
FIG. 2 shows in section the cathode-ray tube of FIG. 1 through the line 2—2.

Throughout the description, wherever possible, similar parts will be designated with the same reference numerals to better facilitate the understanding of the invention. Now referring to the drawings and particularly to FIGS. 1 and 2 there is shown in a cathode-ray tube of the type adapted for the reconstitution of color images and generally designated as the Lawrence or Chromatron tube similar to that shown in U.S. Patent No. 2,692,532, issued October 26, 1954 to E. O. Lawrence. The Lawrence tube is shown here as merely illustrative of one type of tube which can and does make use of the invention. Other color tubes such as the shadow mask tube can make use of the invention as embodied in the instant application. The tube elements in part are similar to other cathode-ray tubes and the tube proper comprise in general a glass envelope 10 with a glass face plate panel 11 forming a part thereof. An indirectly heated cathode 12 acts as a source of electrons for development into a scanning beam, the latter being indicated by the trace 13. Adjacent to and partially surrounding the cathode 12 is a control grid 14, suitably apertured to permit the passage of electrons in accordance with the potentials applied thereto relative to the cathode 12. Also within the tube there is provided a first anode 15 to which suitable potentials may be applied so as to result in an initial acceleration of electrons emitted from the cathode 12. Adjacent to anode 15 there is positioned a second anode 16 for applying an additional acceleration to the electrons. Deflection coil 17 for the usual vertical and horizontal scanning purposes are provided together with focusing coil 17a to cause the electron beam to scan a phosphor coated target 18, which is to be formed according to the invention herein, to produce light which is visible through the face plate 11 of the cathode-ray tube 10. A switching grid 20, usual to the above mentioned Lawrence tube is shown suitably positioned within the tube 10 so as to cause the beam 13 to intercept the target at the appropriate point.

Figure 3:
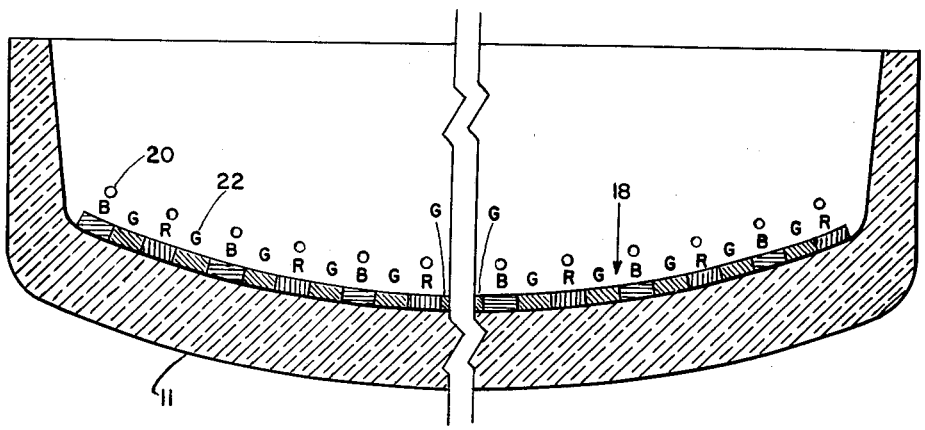
FIG. 3 shows in section a panel and finished grid control in proximity thereto used in the cathode-ray tube of FIG. 1.
Figure 3A:
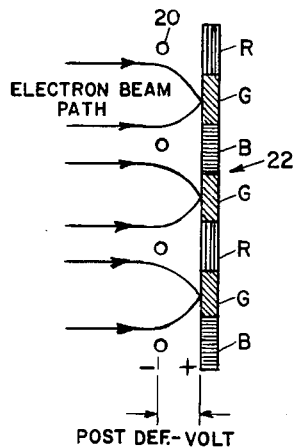
FIGS. 3a, 3b and 3c show illustratively how the electron beam is controlled by the switching grid.
Figure 3B:
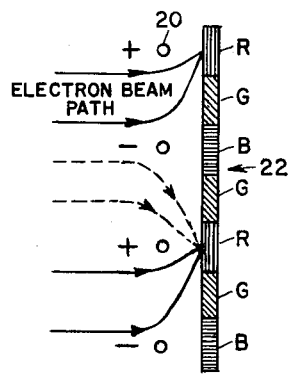
Figure 3C:
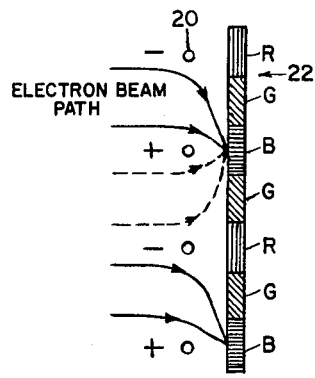
Figure 4:
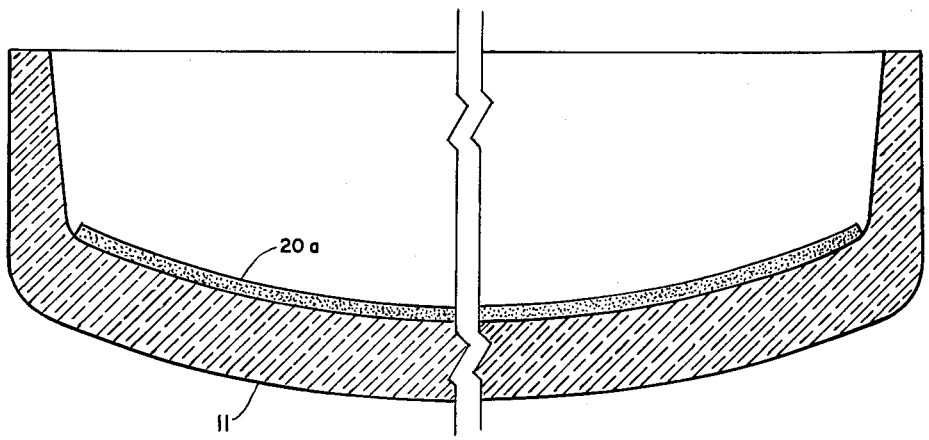
FIGS. 4–12 show in section the face plate panel of the color cathode-ray tube of FIG. 1 and the various steps which go to make up the process of forming the color screen according to the invention herein.

To further aid in the understanding of the invention, it may be desirable to show at this time how the Lawrence tube which uses the invention operates. The tube uses the principle known as post-deflection-focusing (PDF) and is designed with a relatively large number of narrow component color phosphor strips laid down in a predetermined sequence to form a screen or target electrode. This is illustrated in FIGS. 3, 3a, 3b and 3c. These phosphors strips luminesce, when impacted by the cathode-ray beam, in various component colors of the image to be synthesized. Generally the order in which the phosphor strips may be laid down are red, green, blue, green, red, green, and etc., bearing in mind that the color of a phosphor as used herein refers to the color of the light emitted therefrom which is seen by an observer. An electrically-conductive coating overlies the phosphor strips and is produced in some preferred manner such as aluminization. The grid itself is formed of a large number of linear conductors, extending in the same direction as the phosphor strips and lying in the path of electrons directed to the target electrode from the electron gun of the cathode-ray tube. The wires of the grid are electron-optically related to the phosphor strips so that, in this electron sense, there is a wire aligned with each red and blue color strip. Between the actual or nominal plane of the wire grid and the conductive coating on the phosphor strips a difference of potential is established, called the post-deflection-focus-voltage. The proper magnitude and polarity of this post-deflection-focus voltage produces a series of converging electrostatic fields for the beam electrons. These converging fields (which may be likened in an optical sense to cylindrical lenses) cause the beam electrons arriving at the wire grid from the electron gun of the tube to form a fine line structure on the phosphor target. Color control is brought about by a cyclic change in the potentials applied to selected grid wires, to deflect the beam from green, as shown in FIG. 3a, to red as in FIG. 3b, and to blue as in FIG. 3c. The switching grid, of which the grid wires are a part has applied an additional D.C. voltage, over and above the usual accelerating electrode voltage applied thereto, of a given polarity sufficient to set up an electric field in the area of the grid to cause the beam to impinge the target surface at a location normally occupied by the blue phosphor elements or strips. The amount of deflection of the beam is a function of the D.C. voltage applied to the switching grid. It may be appreciated here that if this magnitude were varied for succeeding scans, the width of the exposed surfaces, upon which the beam impinges, can be varied accordingly to produce phosphor strips of different sizes. In FIGS. 3b and 3c it can be seen that the electron beams from adjacent pairs of grid wires form paths which converge in a finite spot at the target surface and substantially at the mid-point thereof when the selecting voltage is of the proper magnitude. However, it is possible to deflect the beam away from the mid-point of the selected color target area and in the direction of another color area, while still on the selected target, by increasing or decreasing the magnitude of the selecting voltage. In other words if the selector were set for red, to offset the point of impingement it would be necessary to apply say less red and more blue selector voltage. Thus in this manner the area of impingement of the beam may be increased. The same result may be achieved by applying one fixed D.C. potential to the grid wires and then superimposing an A.C. voltage of some fixed frequency upon the D.C. voltage. This causes the electron beam to wobble about the D.C. axis and to deviate therefrom an amount determined by the amplitude of the A.C. voltage, thus changing the size of the area of the target surface exposed.

The operational principles of the Lawrence tube outlined above can be made use of in order to form the screen shown in FIGS. 4 through 12. The steps for carrying out the invention comprises first coating the face plate panel 11 on the gun side of the viewing surface of the tube with a relatively thin layer of an electron sensitive material such as Kodak Photographic Resist (KPR) 20a which is a photo-sensitive lacquer intended for the graphic arts, but has been found to have sensitivity to an electron beam. Other types of suitable resins such as polyvinyl alcohol (PVA) can also be used which are also sensitive to an electron beam without detracting from the true purpose of the invention. Incorporated in the resin is a conductive filler such as carbon, aluminum, beryllium and the like to make the resin or photo-sensitive layer conductive to an impinging electron beam. The panel 11 is then mounted or assembled as part of a demountable tube of the type shown in FIGS. 1 and 2 similar to the Lawrence or Chromatron tube. The post-deflection-focusing (PDF) switching or color control grid 20 peculiar to this Lawrence tube is placed in the position it ordinarily occupies in the finished tube, and the tube then evacuated to a pressure suitable for its operation with all of the electrode voltages applied as in a normal television receiver.

The switching grid 20 has for example applied thereto a fixed D.C. potential of a given magnitude and polarity sufficient to set up an electric field in the area of the grid wires as previously explained, to cause the beam to impinge the target surface area at a location normally occupied by the blue phosphor elements or strips. It may be appreciated that an A.C. or wobble voltage may be superimposed upon the D.C. voltage to further enhance and control the amount or width of surface area impinged by the electron beam. The time of scanning and the amount of beam curent, the product of both being called the scan factor, will determine the magnitude of or degree of exposure for the particular color field chosen. After this first blue exposure, another scan factor is chosen with the switching grid having a D.C. potential different than the former and polarized in a direction to place the beam in a different position than the former so that the said beam impinges the target surface in the area normally occupied by the red phosphor strip or elements. The scan factor used for each switching position should have some order of magnitude sufficiently different to assure a difference in exposure so that the latent images formed are capable of being developed at different periods of time. It has been found in one case that by applying a ratio of say four to one (4:1) for the scan factor for two different exposures that the complete and orderly development of one image had no effect on the other image but left it completely undeveloped.

Another consideration with respect to the scan factor is the manner in which it can be utilized to give either a positive or negative electron image. Where the beam current and scan time are adjusted for a positive image, those areas impinged by the beam will pull away from the glass panel in the development stage and leave clear areas. However, if the adjustments were made for a negative image, the impinged areas would remain upon development and the unimpinged areas would wash away. By experiment it has been found that it takes at least four times the product of beam current and time of scanning or scan-factor, to form a negative image as it takes to form a positive image. After the two exposures, such as scanning in the one field and then subsequently in the other field, the demountable tube is let down to air and the face plate panel removed. The resin-carbon film on the face plate panel with the latent images formed thereon, is then subjected to a suitable solvent such as trichlorethylene or the like.

Figure 5:
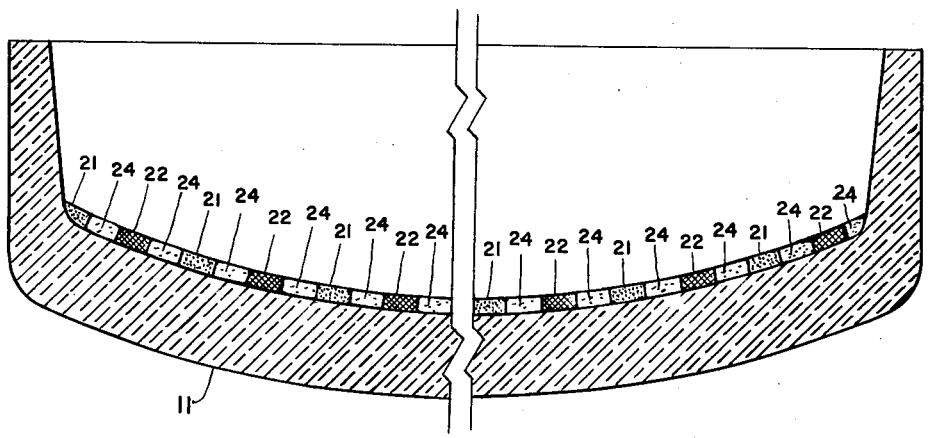
Figure 6:
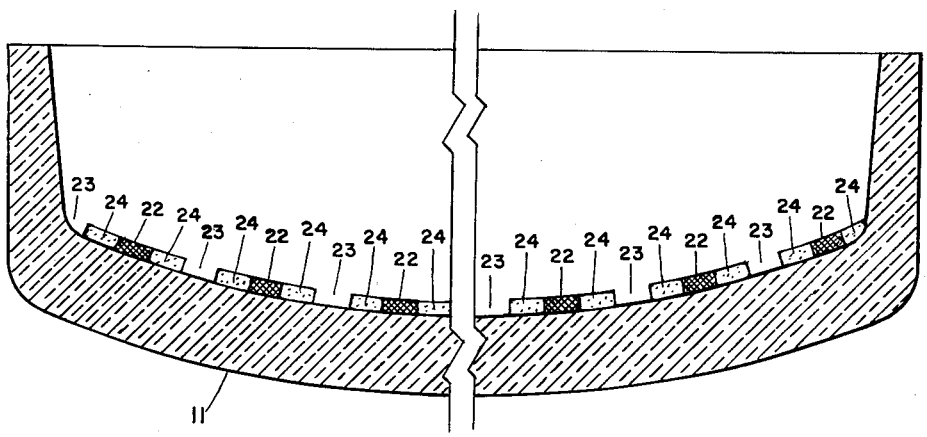

FIG. 5 shows the face plate panel 11 with the respective exposed red 21 and blue 22 areas, the red areas being of greater density than the blue for purposes of illustration in order to show a greater degree of exposure or scan factor. It may be appreciated here that for larger scan factors the development time will be shorter for the same developer concentration. In other words, for the same developer the time of development varies universely to the degree of exposure or scan factor. However, it may be appreciated that where development time is to be speeded up, stronger development concentrations must be used. The panel 11 and the exposed resin-carbon surface residing thereon and having the latent blue and red phosphor strip image positions, is first subjected to an etching out solution or developer, such as, for example, trichlorethylene previously mentioned, to etch out the exposed resin-carbon in those positions normally occupied by the red phosphor. This operation leaves clear spaces 23, as shown in FIG. 6, for the subsequent application of the red phosphors, and also leaves the unexposed resin areas 24 which remains substantially opaque, these particular areas to be substantially occupied by the green phosphors and the exposed blue areas 22.

Figure 7:
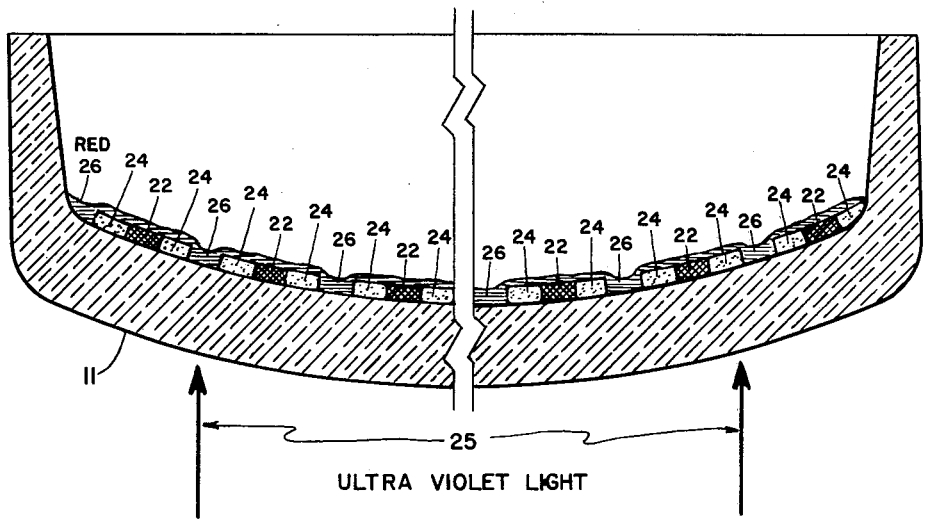

After the etching process as outlined above, a slurry of polyvinyl alcohol and red phosphor is then poured into the panel, as shown in FIG. 7, so that the solution covers substantially all of the clear spaces 23. A portion of the solution occupies not only the clear spaces 23, but also those areas above the exposed and the unexposed resin-carbon material not yet removed from the panel. These areas are generally in the blue and green phosphor positions of the tube. The red phosphor slurry is then exposed to a flood of ultra-violet light 25, emanating from the viewing side of the tube, in such a manner that the actinic rays go through the face plate glass, photo-chemically hardening the exposed blue phosphor slurry so as to fix the same in the red phosphor position 26 to assure that it does not wash away in the rinse. The unexposed solution, such as that portion which resides above the exposed resin-carbon and remaining in the panel, is subsequently washed away by a water rinse or some other type of aqueous solution. By exposing the phosphor slurry from the viewing side of the tube, the bonding thereof at the glass surface is reasonably assured. The phosphor thickness may be easily controlled and is not a critical factor for bonding purposes as in the case where exposure takes place from the gun side of the tube.

Figure 8:
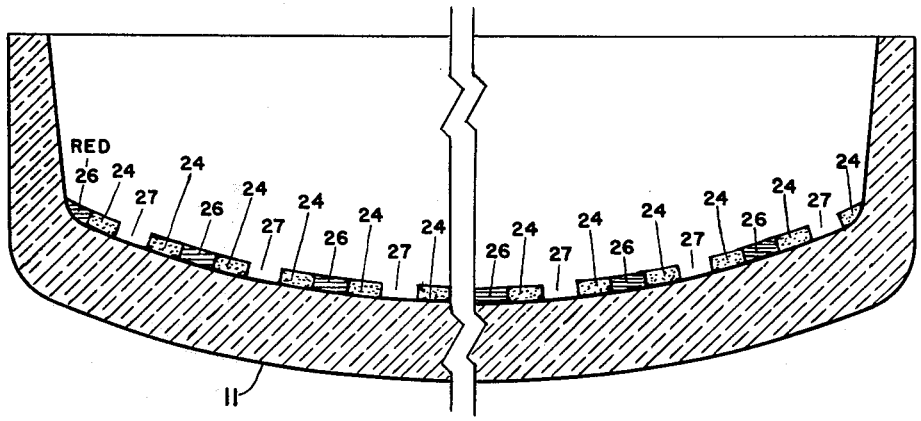
Figure 9:
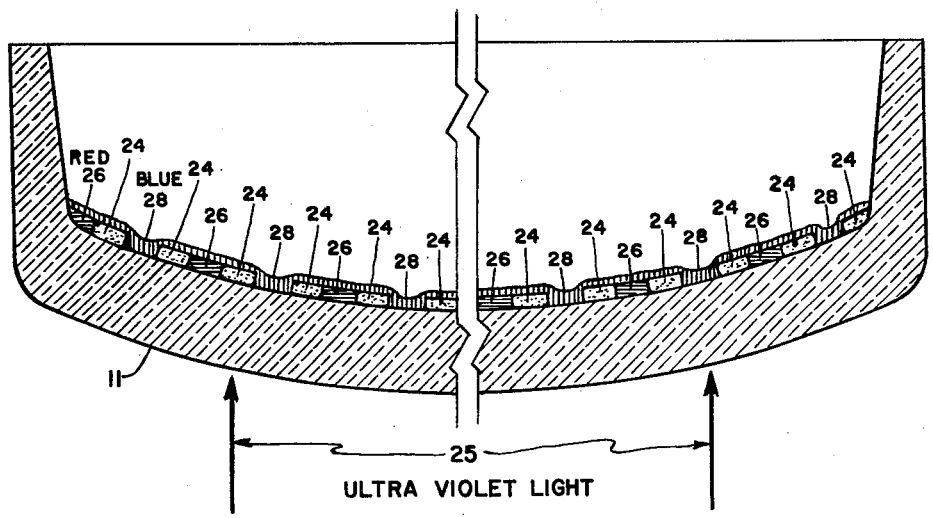
Figure 10:
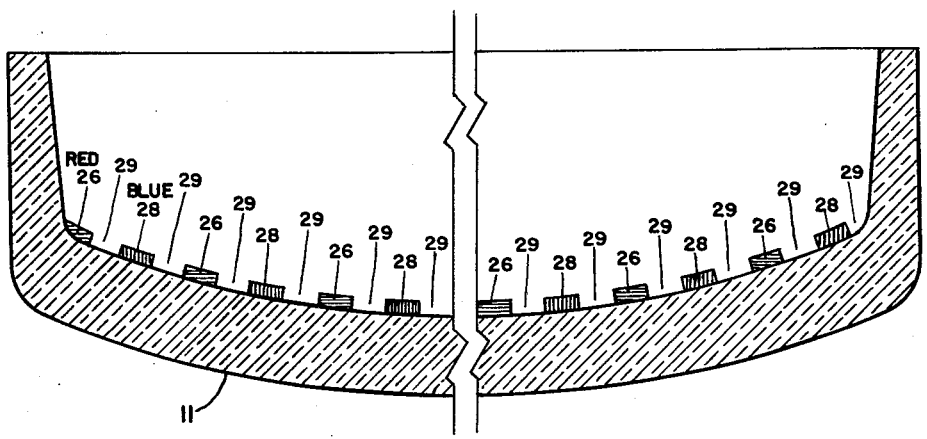

The panel 11 is next subjected to a similar type of developing process as was used with the first latent image, however, using either the same developer concentration as was used before or using a more concentrated solution, depending upon the time in which the etching out process of the exposed area is to be completed. After a time sufficient to remove or etch out the exposed carbon or resin-carbon from the normally occupied blue phosphor positions has elapsed, there remaining clear spaces 27 as shown in FIG. 8 between the normally green phosphor positions, a solution of polyvinyl alcohol and blue phosphor slurry is next poured into the panel so as to cover the said blank spaces 27, occupied usually by the blue phosphor strips 28 as shown in FIG. 9. A portion of the blue phosphor solution covers the tops of the previously applied red phosphor 26, and the exposed carbon-resin residing in the position normally occupied by the green phosphor strips. It must be appreciated here that prior to the pouring in of the red phosphor solution, an ultra-violet light inhibitor, such as tartrazine and the like, is applied and absorbed by the red phosphors to prevent the exposure of any of the blue phosphor slurry which may reside over or on top of the red phosphor, thus preventing the fixation thereof. After the pouring in of the blue phosphor solution, the same is exposed to a flood of ultra-violet light 25, as in the previous case with respect to the red phosphor, to fix the blue phosphors. The panel is then washed down or a water rinse applied to remove the unexposed blue phosphor solution. The areas normally occupied by the green phosphor strips or stripes are opaque and removed by either baking out or by chemical means. Such chemical means may include among other things Kodak Photo-Resist Developer solution or a solution of either Tolnol or Xyol made by the Du Pont Chemical Company. FIG. 10 shows the panel with the red and blue phosphors in their appropriate registered positions with blank spaces 29 between alternate red and blue phosphor strips.

At this stage of the screen development, the panel has both the red and blue phosphor stripes in their true registered positions. It may be appreciated here that the demountable tube for electron printing was assembled in a manner similar to the tube in an ordinary receiver which utilizes this tube, and that all the electrode voltages were adjusted just as in the case of the receiver when normally operated. For example, the deflection voltages and the anode and cathode voltages have values whose magnitudes are the same as in the usual receiver. It can now be appreciated that for each switching position a different scan factor would have to be used in order to achieve different degrees of exposure and, therefore, different latent images, each image capable of being distinguishable from the other because of this difference in degrees of exposure and thereby allowing for individual image development.

Figure 11:
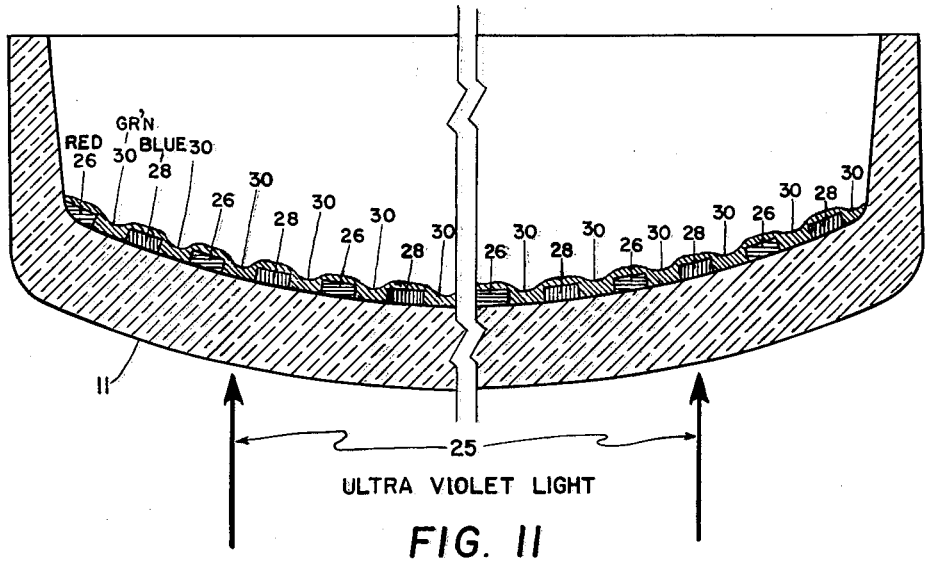
Figure 12:
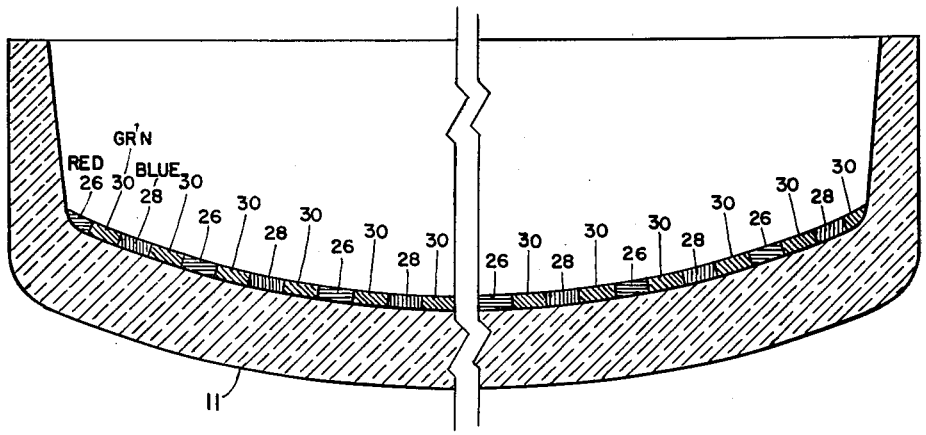

Returning to FIG. 10 the empty spaces 29 in the panel has poured therein a solution of polyvinyl alcohol and green phosphor slurry as shown in FIG. 11, the same as was done in the previous cases. The solution covers substantially all of the blank areas 29 above mentioned. The green phosphor solution covers not only the blank spaces, but also covers the areas above the previously deposited red and blue phosphors. Again it must be appreciated that the red phosphor has also applied thereto the chemical agent tartrazine, as in the case of the blue phosphor, the ultra-violet light inhibitor for the purpose previously explained. The green phosphor solution is then exposed to a flood of ultra-violet light 25 in order to fix the green phosphor in the appropriate green phosphor position. FIG. 12 shows the red, green and blue phosphors appropriately deposited in their correct registered positions. The panel is then washed down and baked to remove the ultra-violet light inhibitors previously absorbed by the blue and red phosphors.

Figure 13:
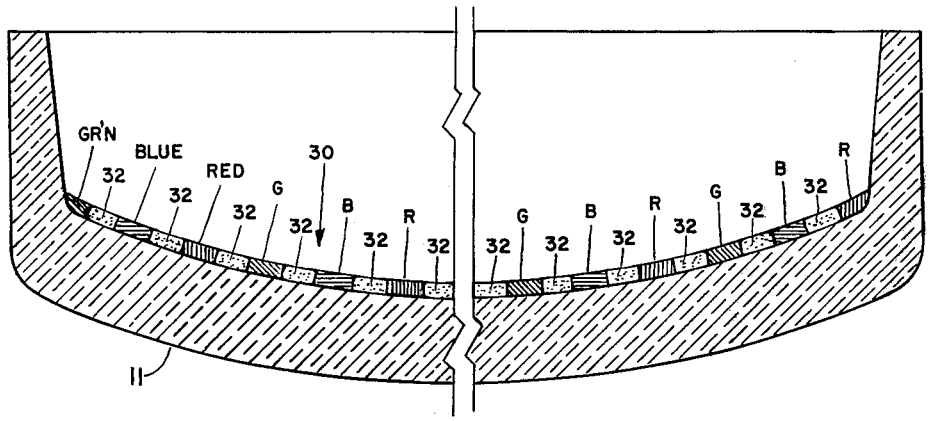
FIGS. 13 and 14 show in section a face plate panel having disposed thereon another target or screen configuration.
Figure 14:
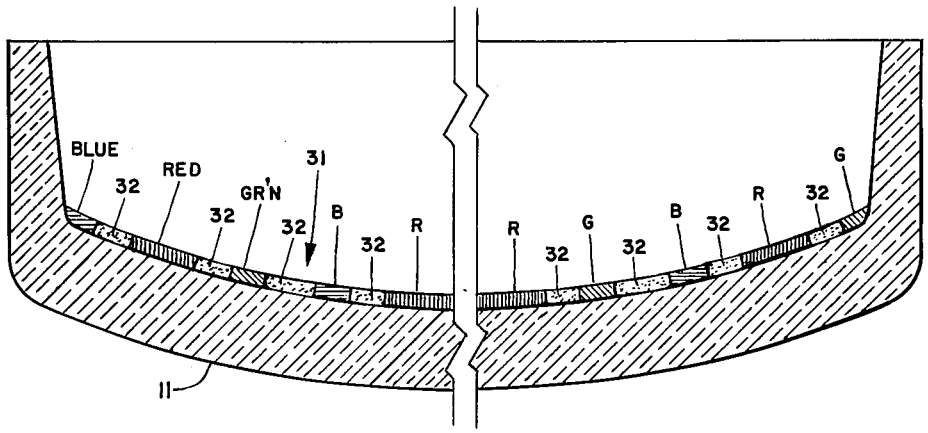

FIGS. 13 and 14 show panels with target surfaces 30 and 31, disposed thereon having a pattern or configuration different from those shown previously, but capable of being fabricated in a manner similar to the invention disclosed herein. FIG. 13 shows a target or screen composed of three different color phosphor strips, each laid down in a blue, red and green sequence, and each sequence being repeated for the entire screen. Also there is disposed between each pair of the spaced color strips a guard area 32. The guard area 32 is composed of an opaque material insensitive to an electron beam so that no light or energy will emanate therefrom. The method for forming the screen follows substantially the same general steps as previously outlined. In short first the green field is scanned at a particular scan factor, then the blue field is scanned at another factor and finally the red field is scanned at still another scan factor, the color control electrode or structure being disposed to control the point of impingement of the electron beam on the surface area for any particular given color field. Subsequently the images for the three color fields are developed, with the appropriate colored phosphor, deposited after each etching out process has been completed for each of the individual fields. Finally the areas defined between adjacent color strips after the appropriate colored phosphors have been deposited, are filled with electron insensitive opaque nonluminescent material. This material can be in the form of a ceramic coloring agent consisting of a calcined mixture of metallic oxides and the like. Although FIG. 13 shows the individual color strips each of the same width, it may be appreciated that the said widths may be different as shown in FIG. 14. Here the green and blue phosphor color strips are of the same width, but the width of the red is greater. This variation in strip widths is merely presented here as an illustration of the type of screen configurations possible with the invention disclosed herein. Other configurations of the screen structure are possible without the use for further illustration here.

Having described the invention what is claimed is:

1. A controllable variable exposure electron beam printing method for printing chromatic electron images on transparent screen surfaces comprising, coating the surface with an electron sensitive material, exposing the surface to the electron beam in at least one of a plurality of controlled positions of the beam, the exposure varying in accordance with the respective controlled positions of the beam to form a latent beam image responsive to each exposure, subsequentially etching out the exposed surface material according to each controlled position and exposure of the beam, after each etching depositing at least one of a plurality of other materials each capable of being distinguishable from the other to define each of the controlled positions of the electron beam.

2. In a single pump down vacuum chamber system a controllable variable exposure electron beam printing chromatic method for printing electron images on transparent screen surfaces within the system comprising, coating the surface with an electron sensitive material, evacuating the chamber system to produce a substantial vacuum, exposing the surface to the electron beam, in at least one of a plurality of controlled positions of the beam, the exposure varying in accordance with the respective controlled positions of the beam to form a latent beam image responsive to each exposure, letting the system down to air, sequentially etching out the exposed surface material according to each controlled position and exposure of the beam, after each etching depositing at least one of a plurality of chromatic materials each capable of being distinguishable from the other when impinged by the electron beam to define each of the controlled positions of the electron beam.

3. A controllable variable exposure electron beam printing method for printing color electron images on glass surfaces comprising, coating the surface with an electron sensitive material, exposing the surface to the electron beam in at least one of a plurality of controlled positions of the beam, the exposure varying in accordance with the respective controlled positions of the beam to form a latent beam image responsive to each exposure, sequentially etching out the exposed surface material according to each controlled position and exposure of the beam, after each etching out process depositing and fixing in the area vacated by the etched out material a fluorescent material adapted to fluoresce in at least one of a plurality of different colors upon electron impingement in accordance with the controlled position of the electron beam.

4. In a single pump down vacuum chamber system a controllable variable exposure electron beam printing color method for printing electron images on glass surfaces within the system comprising, coating the surface with an electron sensitive material, evacuating the chamber system to produce a substantial vacuum, exposing the planer surface to the electron beam in at least one of a plurality of controlled positions of the beam, the exposure varying in accordance with the respective controlled positions of the beam to form a latent beam image responsive to each exposure, letting the system down to air, sequentially etching out the exposed surface material according to each controlled position and exposure of the beam, after each etching out process depositing and fixing in the area vacated by the etched out material a fluorescent material adapted to fluoresce in at least one of a plurality of different colors upon electron impingement in accordance with the controlled position of the electron beam.

5. An electron printing method for printing the path in color of an electron beam on glass surfaces comprising, coating the surface with an electron sensitive material, exposing the surface to the electron beam in at least one of a plurality of controlled positions of the beam, the exposure varying in accordance with the respective controlled positions of the beam to form a latent beam image responsive to each exposure, sequentially etching out the exposed surface material according to each controlled position and exposure of the beam, after each etching out process depositing and fixing in selectively selected spaced areas fluorescent material adapted to fluoresce in at least one of a plurality of different colors upon electron impingement in accordance with the controlled position of the electron beam in those selectively selected areas, and depositing and fixing non-fluorescent material in those non-selected areas whose position is defined by the spaced selected areas and disposed to be insensitive to the electron beam impingement and nonfluorescent.

6. An electron printing method for printing the path of an electron beam in color on glass surfaces according to claim 5 and wherein the non-selected areas are disposed to lie between consecutively spaced selected areas and contiguous therewith.

7. A controlled variable exposure electron beam printing method for printing tri-color television cathode-ray tube screen surfaces representative of electron beam images comprising coating the surface with a thin film of an electron sensitive resin, exposing the surface to the beam in a first controlled position at a first beam density to form a latent beam image in accordance with the first beam density exposure, exposing the surface to the beam in a second controlled position spaced from the first position and at a second beam density to form another latent beam image in accordance with the second beam density exposure, developing and etching out the exposed resin in the first controlled position and depositing and fixing therein a first color phosphor disposed to fluoresce upon electron impingement, developing and etching out the exposed resin in the second controlled position and depositing and fixing therein a first color phosphor disposed to fluoresce upon electron impingement, developing and etching out the exposed resin in the second controlled position and depositing and fixing therein a second color phosphor, the first and second color phosphor areas defining an area therebetween for the deposition of a third color phosphor after unexposed resin has been etched out of the said area.

8. A controlled variable exposure electron beam printing method according to claim 7 and wherein there is further defined an area between the respective phosphor areas for the deposition of inert material which does not fluoresce upon electron impingement.

9. In a single pump down vacuum chamber system a controllable variable exposure electron beam printing method for printing tri-color television cathode-ray tube screen surfaces representative of electron beam images within the system comprising coating the surface with a thin film of an electron sensitive resin evacuating the chamber system to produce a substantial vacuum, exposing the surface to the beam in a first controlled position at a first beam density to form a latent beam image in accordance with the first beam density exposure, exposing the surface to the beam in a second controlled position spaced from the first position and at a second beam density to form another latent beam image in accordance wtih the second beam density exposure, letting the system down to air, developing and etching out the exposed resin in the first controlled position and depositing and fixing therein a first color phosphor disposed to fluoresce upon electron impingement, developing and etching out the exposed resin in the second controlled position and depositing and fixing therein a second color phosphor, the first and second color phosphor areas defining an area therebetween for the deposition of a third color phosphor after unexposed resin has been etched out of the said area.

10. A controlled variable exposure electron beam printing method according to claim 9 and wherein there is further defined an area between the respective phosphor areas for the deposition of inert material which does not fluoresce upon electron impingement.

11. In an electron tube discharge device having electron beam generating and scanning means including a signal control electrode and wherein the product of beam current and scanning time herein called the scan factor is disposed to produce a variation of electronic exposures upon electron impingement of the beam, the method for producing electron beam images on a transparent screen surface in proximity to the control electrode comprising coating the surface with an electron sensitive material, exposing the said surface to the electron beam in at least one of a plurality of controlled positions of the beam in accordance with the signal applied to the control electrode and at a predetermined scan factor, the exposure varying according to the said scan factor to produce a plurality of latent beam images each indicative of the controlled position of the beam, sequentially etching out the exposed surface material according to each controlled position and exposure of the beam, after each individual etching out process depositing and fixing thereafter in the area vacated by the etched out material at least one of a plurality of other materials each capable of being distingiushable from the other to define each of the controlled positions of the electron beam.

12. In an electron tube discharge device having electron beam generating and scanning means including a signal control electrode and wherein the product of beam current and scanning time herein called the scan factor is disposed to produce a variation of electronic exposures upon electron impingement of the beam, the method for producing electron beam images on a transparent screen surface in proximity to the control electrode according to claim 11 and wherein each of the successive controlled positions of the beam defines an area therebetween unexposed to the said beam, the unexposed material in the said areas being removed and another material deposited and fixed therein capable of being distinguishable from the material in the exposed areas.

13. In an electron tube discharge device having electron beam generating and scanning means including a signal control electrode and wherein the product of beam current and scanning time herein called the scan factor is disposed to produce a variation of electronic exposures upon electron impingement of the beam, the method for producing electron beam images on a glass surface in proximity to the control electrode comprising coating the surface with an electron sensitive material, exposing the said surface to the electron beam in at least one of a plurality of controlled positions of the beams in accordance with the signal applied to the control electrode and at a predetermined scan factor, the exposure varying according to the said scan factor to produce a plurality of latent beam images each indicative of the controlled position of the beam, sequentially etching out the exposed surface material according to each controlled position and exposure of the beam, after each individual etching out process depositing and fixing thereafter in the area vacated by the etched out material a fluorescent material adapted to fluoresce in at least one of a plurality of different colors upon electron impingement in accordance with the controlled positions of the electron beam.

14. In an electron tube discharge device having electron beam generating and scanning means including a signal control electrode and wherein the product of beam current and scanning time herein called the scan factor is disposed to produce a variation of electronic exposures upon electron impingement of the beam, the method for producing electron beam images on a glass surface in proximity to the control electrode comprising coating the surface with an electron sensitive material, exposing the said surface to the electron beam in at least one of a plurality of controlled positions of the beams in accordance with the signal applied to the control electrode and at a predetermined scan factor, the exposure varying according to the said scan factor to produce a plurality of latent beam images each indicative of the controlled position of the beam, sequentially etching out the exposed surface material according to each controlled position and exposure of the beam, after each individual etching out process depositing and fixing thereafter in the area vacated by the etched out material a fluorescent material adapted to fluoresce in at least one of a plurality of different colors upon electron impingement in accordance with the controlled positions of the electron beam, thereafter etching out the unexposed material in the unexposed areas and depositing therein inert phosphor.

15. In an electron tube discharge device having electron beam generating and scanning means including a signal control electrode and wherein the product of beam current and scanning time herein called the scan factor is disposed to produce a variation of electronic exposures upon electron impingement of the beam, the method for producing electron beam images on a glass surface in proximity to the control electrode according to claim 13 and wherein each of the successive controlled positions of the beam defines an area therebetween unexposed to the said beam, the unexposed material in the said area being removed and an inert material, insensitive to the electron beam, deposited and fixed therein and capable of being distinguishable from the said fluorescent material.

16. In an electron tube discharge device having electron beam generating and scanning means including a signal control electrode and wherein the product of beam current and scanning time herein called the scan factor is disposed to produce a variation of electron exposures upon electron impingement of the beam, the method for producing electron beam images on a surface in proximity to the control electrode comprising, coating the surface with an electron sensitive material, exposing the surface to the electron beam in a first control position of the beam in accordance with a first predetermined control electrode signal and scan factor, exposing the surface to the electron beam in a second control position in accordance with a second predetermined control electrode signal and scan factor, exposing the surface to the electron beam in a third control position in accordance with a third predetermined control electrode signal and scan factor, etching out the exposed surface material according to the first control position, depositing and fixing phosphor of a second color in the area vacated by the said etched out material for the said second control position of the beam, etching out the exposed surface material according to the third control position, depositing and fixing in the said etched out area phosphor of third color, the three colored phosphors thus disposed upon the said surface defining the electron beam images in each of its controlled positions.

17. In an electron tube discharge device having electron beam generating and scanning means including a signal control electrode and wherein the product of beam current and scanning time herein called the scan factor is disposed to produce a variation of electron exposures upon electron impingement of the beam, the method for producing electron beam images on a surface in proximity to the control electrode according to claim 16 and wherein each of the successive controlled positions of the beam defines an area therebetween unexposed to the said beam, the unexposed material in the said area being removed and an inert material, insensitive to the electron beam, deposited and fixed therein and capable of being distinguishable from the said fluorescent material.

18. In color television, the method of making a screen having a plurality of sets of areas which luminesce in distinct color on electron impact produced by application of a separate voltage condition to a control electrode structure, said method comprising the steps of coating a screen support with a layer of material selectively removable after electron impact thereon, exposing said layer to an electron beam at each of said voltage conditions with a different exposure as to such voltage condition to produce on said coating a plurality of latent images of unequal removability, separately and sequentially developing each of said images to remove said layer at the location of each such image and depositing on said support at the location of each such image as so developed the material of luminescence in a distinct color.

19. In color television, the method of making a screen according to claim 18 and wherein the said layer of material not electronically impacted is finally removed and an inert material deposited in the area so removed, the said inert material being non-luminescent when impacted by the electron beam.

20. In color television, the method of making a screen according to claim 19 and wherein the inert material is graphite.

References Cited in the file of this patent
UNITED STATES PATENTS

| | | |
|---|---|---|
| 802,471 | Powrie | Oct. 24, 1905 |
| 916,467 | Lumiere | Mar. 30, 1909 |
| 2,442,961 | Ramberg | June 8, 1948 |
| 2,727,828 | Law | Dec. 20, 1955 |
| 2,831,918 | Dome | Apr. 22, 1958 |